United States Patent [19]

Ogata et al.

[11] Patent Number: 4,629,166
[45] Date of Patent: Dec. 16, 1986

[54] EXHAUST-GAS TREATMENT SYSTEM FOR A SEALED-TYPE CONVERTER

[75] Inventors: Seishi Ogata, Kitakyushu; Keizi Arima, Sakai; Masahiro Ohtsuki, Chiba, all of Japan

[73] Assignees: Nippon Steel Corporation, Tokyo; Kawasaki Jukogy Kabushiki Kaisha, Kobe, both of Japan

[21] Appl. No.: 809,412

[22] Filed: Dec. 16, 1985

[51] Int. Cl.$^4$ ................................................ C21C 5/38
[52] U.S. Cl. .................................... 266/158; 98/115.1; 137/467; 266/159
[58] Field of Search ........................ 266/158, 159, 287; 98/115.1; 126/307 A; 137/467, 526

[56] References Cited

U.S. PATENT DOCUMENTS

| | | | |
|---|---|---|---|
| 3,216,819 | 11/1965 | Holiday, Jr. et al. | 266/159 |
| 3,410,288 | 11/1968 | Hajek | 266/158 |
| 3,439,910 | 4/1969 | Regelin et al. | 266/287 |
| 3,616,745 | 11/1971 | Russell, Sr. | 98/115.1 |
| 4,082,253 | 4/1978 | Pike | 266/159 |
| 4,273,153 | 6/1981 | Brown | 137/526 |

Primary Examiner—L. Dewayne Rutledge
Assistant Examiner—Robert L. McDowell
Attorney, Agent, or Firm—Wenderoth, Lind & Ponack

[57] ABSTRACT

An exhaust-gas treatment system for a sealed-type converter has a hood for guiding converter exhaust gas and is provided with an emergency air admission valve device communicatively connected to the hood and comprising, essentially, a valve seat communicating with a valve entrance for inflow of outside air, a valve body normally in valve closed position against the valve seat to shut off air from entering the hood, and a valve body locking device functioning to normally hold the valve body in locked state in the valve closed position and operating in an emergency to release the valve body, which thereupon separates away from the valve seat thereby to admit outside air into the hood to prevent occurrence of negative pressure in the hood.

6 Claims, 3 Drawing Figures

4,629,166

EXHAUST-GAS TREATMENT SYSTEM FOR A SEALED-TYPE CONVERTER

BACKGROUND OF THE INVENTION

This invention relates generally to steel converters and exhaust-gas treatment systems therefor and more particularly to an exhaust-gas treatment system of a sealed-type converter for operating in a fully sealed state relative to the outside air or a state close thereto.

More specifically, the invention concerns an exhaust-gas treatment system of the above stated kind which is provided with an emergency air admission valve device which is normally closed for normal operation of the converter and its exhaust-gas treatment system but operates instantaneously when there is an abrupt interruption of the converter operation to admit outside air into the hood of the exhaust-gas treatment system thereby to prevent the occurrence of abnormal negative pressure in the hood and related parts of the system.

As is well known, the operation of a converter comprises the three process steps of charging, blowing, and pouring. In the blowing step, as will be described in detail hereinafter, pure oxygen is blown through an oxygen lance or jet into molten metal in the converter to accomplish refining. The oxygen thus blown and carbon within the molten metal react to form a large quantity of carbon monoxide, CO, gas. Ordinarily, the converter is provided with an exhaust-gas treatment system for recovering this CO gas, which has commercial value, and preventing leakage of CO gas into the surrounding atmosphere.

The exhaust-gas processing system is coupled to the converter mouth by a hood. Since the converter is tilted about a horizontal axis for the charging and pouring steps mentioned above, the hood must be uncoupled from and recoupoled to the converter mouth at the beginning and end of each of these steps. Accordingly, the hood is provided with a skirt which can be raised and lowered for attachment to and detachment from the converter mouth. In a system wherein this skirt is adapted to fit tightly in a leak-proof or very nearly leak-proof manner against the converter mouth, the converter becomes one referred to herein as a sealed-type converter.

Normal operation of a sealed-type converter is efficient and economical. However, if the operation is suddenly stopped for some reason, a number of problematic situations, including danger of explosion and resulting damage and injury, arise as will be described in detail hereinafter in connection with one embodiment of the invention.

SUMMARY OF THE INVENTION

In view of the above described circumstance in the art, it is an object of this invention to provide an exhaust-gas treatment system of a sealed-type converter, which system is provided with an emergency air admission valve device for preventing abnormal negative pressure within the hood and related parts of the system when an abrupt stoppage of the converter operation occurs.

According to this invention, briefly summarized, there is provided an exhaust-gas treatment system of a sealed-type converter, said system having a hood for guiding converter exhaust gas and being provided with an emergency air admission valve device comprising a valve box having at the upper part thereof a valve entrance for inflow of outside air, an air intake duct communicatively connecting the valve box and said hood, an annular valve seat formed below said valve entrance at the upper part of the valve box, a valve body which is capable of moving up and down within the valve box between an upper position of valve closure against the valve seat to close the valve entrance and a lower position of full valve opening, guide means for guiding the valve body in the up-and-down movement thereof, and a valve body locking device functioning to normally hold the valve body in locked state at said upper position thereof and operating at the time of an emergency to release the valve body thereby to permit the valve body to drop to said lower position thereof and thereby to admit outside air into the hood.

The nature, utility, and further features of this invention will be more clearly apparent from the following detailed description with respect to a preferred embodiment of the invention when read in conjunction with the accompanying drawings.

DETAILED DESCRIPTION OF THE INVENTION

Figure 1:
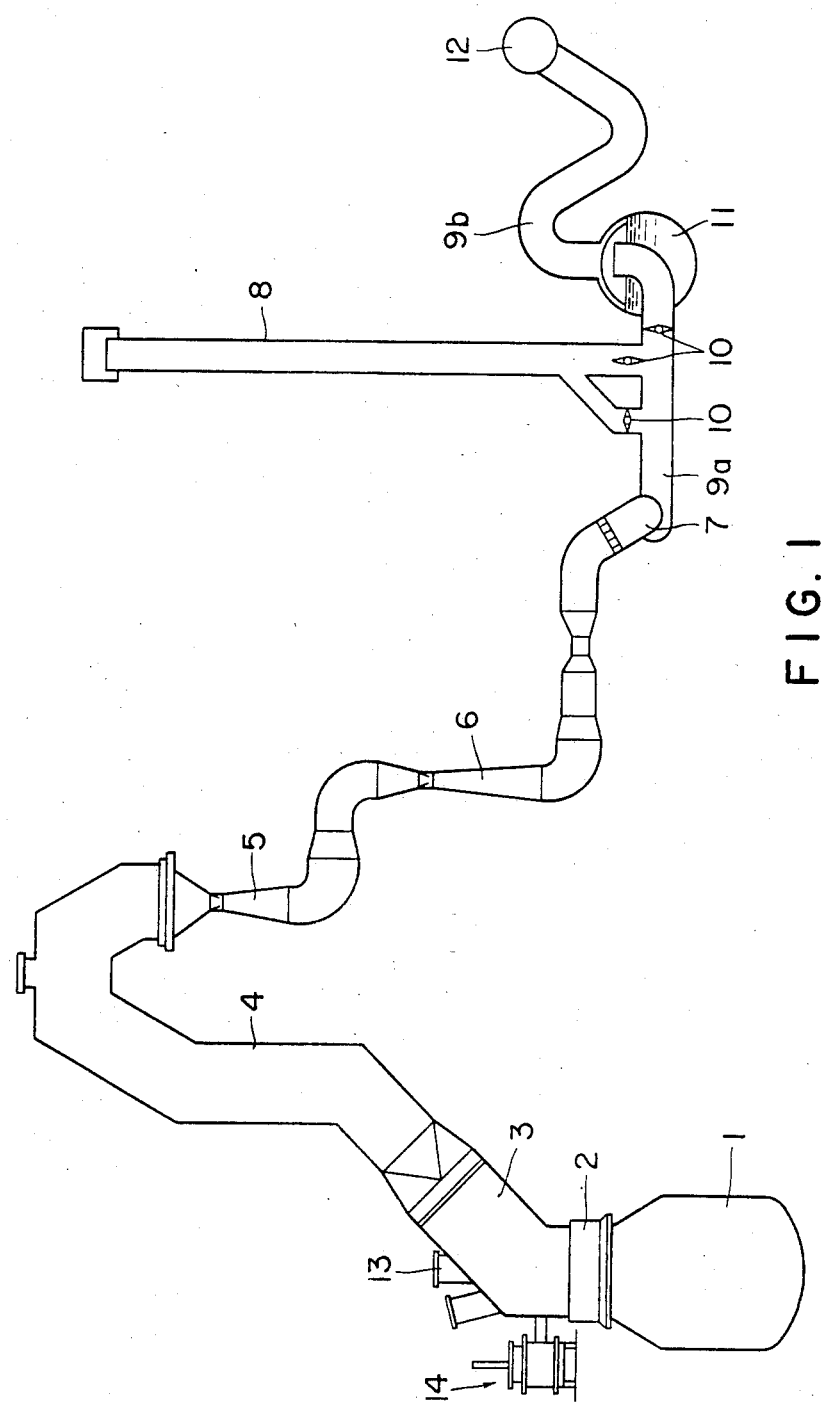
FIG. 1 is a schematic diagram illustrating the esential parts of one example of the exhaust-gas treatment system according to the invention of a sealed-type converter.

Referring to FIG. 1, the essential parts of the example shown therein of the converter exhaust-gas treatment system of this invention are, in sequentially serially connected state from its upstream end, a hood 3 having a skirt 2 connected to the mouth of a converter 1, a cooler 4, dust removers 5 and 6, an induced-draft fan 7, a passage 9a, a stack 8 connected at its lower end to an intermediate part of the passage 9a, a water-sealed check valve 11 connected to the downstream end of the passage 9a, a passage 9b, a duct 12, and a gas holder (not shown). Dampers 10 are provided respectively at the bottom end of the stack 8 and at the downstream end of the passage 9a and can be turned to appropriate positions to direct the flow of gas through the passage 9a selectively either through the stack 8 or through the water-sealed check valve 11.

The hood 3 is provided at an upper part thereof with an oxygen lance fitting 13 for insertion downward of an oxygen lance (not shown) into the converter 1 containing a charge of molten metal. In the operation of the converter 1, pure oxygen is blown through the lance into the molten metal in the converter 1 to accomplish refining. During this blowing-refining action (commonly referred to as "blowing"), the oxygen thus blown through the lance and carbon within the molten metal react, and a large quantity of carbon monoxide, CO, gas at a high temperature is generated.

Gas of low CO concentration thus produced at the initial and final periods of this blowing is drawn into the hood 3 by the induced-draft fan 7, cooled in the hood 3 and the cooler 4, cleaned of dust by the dust removers 5 and 6, and, as it passes upward through the stack 8, undergoes combustion at the upper part thereof, the resulting combustion fumes being dissipated into the atmosphere. The gas of high CO concentration produced in the converter 1 during the period of maximum reaction intensity of the blowing is caused by the changing over of dampers 10 to pass through the water-sealed check valve 11 and the duct 12 to be collected as gas of commercial value in the gas holder.

CO gas is not only extremely dangerous because it can cause CO poisoning if it escapes into atmosphere inhabited by humans and animals, but it can also cause danger of sudden combustion by reacting with outside air. Accordingly, the skirt 2, which is capable of being raised and lowered, is provided between the mouth of the converter 1 and the hood 3, and the gap between the converter mouth and this skirt 2 is closed by lowering the skirt 2 thereby to prevent leakage of CO gas to the outside and infiltration of outside air into the skirt 2.

As was briefly described hereinbefore, the operation of a converter comprises the three process steps of charging, blowing, and pouring. In the first charging step, scrap steel is charged into the converter 1 and molten pig iron produced in a shaft or blast furnace is charged by a hot-metal ladle from an upper level into the converter 1. In the second blowing step, pure oxygen is blown into the molten metal thus charged into the converter 1 thereby to accomplish refining. In the third pouring step, the molten steel thus refined is poured out of the converter into a teeming ladle at a lower level.

Of these three process steps, the first charging step and the third pouring step are carried out with the converter 1 in tilted states, and therefore, the skirt 2 of the hood 3 is raised during these steps. In the second blowing step, the skirt 2 is lowered to close the gap between the mouth of the converter 1 and the skirt 2 thereby to prevent leakage of CO gas to the outside and infiltration of outside air.

In actual practice, however, slag tends to accumulate on the rim of the converter mouth, which therefore does not always have a level smooth surface. Consequently, it becomes impossible to obtain an intimate sealing state between the skirt 2 and the converter mouth, and closure is made in a state wherein a certain amount of opening remains therebetween. For this reason, the infiltration of some outside air into the converter through this opening and the consequent lowering of the CO concentration therewithin has been unavoidable. This common type of converter exhaust-gas treatment system is herein referred to as the "open type".

However, because of the present increase in demand for recovery of gas of high CO concentration (purity) from converter operation, there is a trend toward securing complete sealing or a state very close thereto between the converter mouth and the skirt 2. An exhaust-gas treatment system of this character is herein referred to as that of the "sealed type".

In a converter exhaust-gas treatment system of this complete sealing type, a new technical problem arises in the case of emergency or abrupt stoppage of operation. The ordinary procedure for such an emergency stoppage is to stop the blowing in of oxygen. Consequently, the quantity of the gas generated in the converter suddenly drops.

In a conventional exhaust-gas treatment system of the above mentioned open type, outside air in an amount corresponding to the reduction in quantity of the generated gas is sucked in through the gap between the converter mouth and the skirt 2, and a gas quantity corresponding to the induced gas quantity of the induced-draft fan 7 is secured, whereby the pressure within the exhaust-gas treatment system is maintained. In the case of a sealed type system, however, the pressure within the system undergoes an instantaneous drop to a negative gauge value, which can be of a magnitude to cause damage or breakage to parts of the system, thereby giving rise to a serious problem.

That is, for example, in the case of an instantaneous drop in pressure causing outside air to infiltrate through the sealing part or an inrush of outside air due to breakage, there arises a great possibility of explosion and resulting damage. The reason for this is that the portion of the CO gas at high temperature in the system undergoes gradual natural combustion with the oxygen gas $O_2$ in the outside air, and no explosion occurs, but the low-temperature portion of the CO gas after cooling undergoes instantaneous combustion if there is a source of ignition to cause an explosion.

Furthermore, in the case of the conventional open type system, the $O_2$ in the outside air drawn in through the gap between the converter mouth and the skirt 2 and the CO gas at high temperature react (combustion of CO gas) to form $CO_2$ gas. As a consequence, a layer of this $CO_2$ gas (referred to herein as an inert-gas layer) is interposed between the CO gas previously induced and cooled and the outside air drawn in afterward, whereby contact between the cooled CO gas and the following outside air drawn in is blocked, and there is little danger of an explosion.

In the case of a sealed-type system, however, formation of an amply effective inert gas layer does not occur because there is no infiltration or the infiltration of only a very minute quantity of outside air, whereby there is a great danger of explosion. Still another dangerous situation arises at the initial period and the final period of the blowing step, when because of the small quantity of gas generated in the couverter 1 and also the low CO concentration in the gas, the CO gas is not recovered but is passed through the stack 8 and burned at the top part thereof, the resulting combustion gas being discharged out. However, if an emergency stoppage occurs during such a period, the pressure within the system abruptly drops to a negative value, and at the same time the gas flow velocity within the stack 8 drops. As a consequence, outside air infiltrates into the stack 8 to cause a backfire, whereby there is the danger of a violent combustion or an explosion occurring in the stack 8.

Thus, the instantaneous negative pressure arising within the system as a consequence of the structural character of the sealed type system gives rise to a number of technical problems. Under this present circumstance, there is an urgent need for the development of a converter exhaust-gas treatment system which is capable of efficiently recovering CO gas of high purity and yet has a high degree of safety.

This invention provides such a system for a sealed-type converter.

Figure 2:
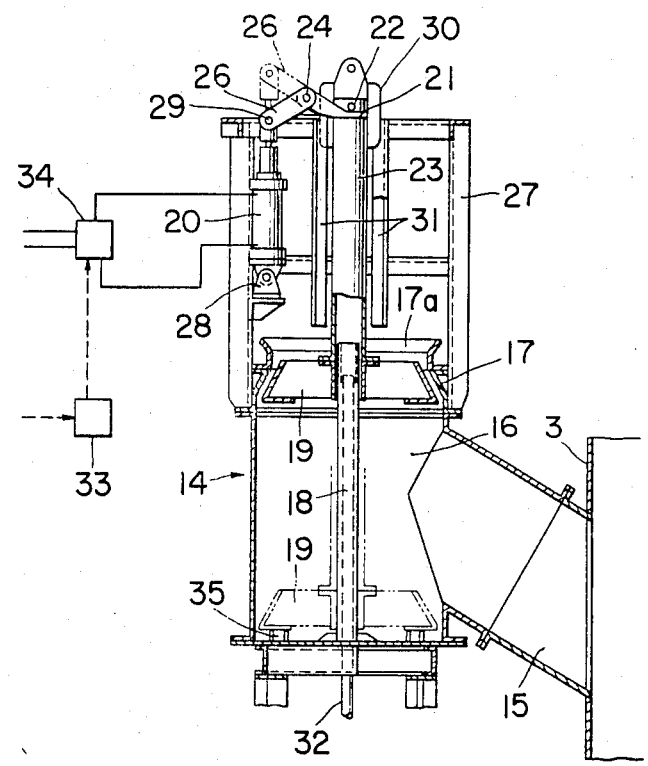
FIG. 2 is a side elevation, mostly in vertical section, showing the essential construction of an embodiment of an emergency air admission valve device constituting an essential component of the system shown in FIG. 1.

In one embodiment of this invention as shown in the drawings, an emergency air admission valve device 14 is connected to the hood 3. As shown in FIG. 2, showing in detail the construction of this valve device 14, this device has a cylindrical valve box 16 of vertical centerline. This valve box 16 is communicatively connected via an air intake duct 15 to the hood 3 and supports around its upper rim an annular valve seat 17 having an air entrance or upper valve seat opening 17a. A valve body 19 having an outer valve surface of frustoconical shape is provided below the valve seat 17 to function cooperatively therewith and is provided with a vertical hollow valve stem 23 coaxially and integrally fixed at its lower end to the valve body 19 and extending upward therefrom.

The valve box 16 provided coaxially therein with a vertical guide rod 18 integrally fixed at its lower end to the bottom of the valve box 16. The above described valve stem 23 is slidably fitted around the guide rod 18. When the valve device 14 is in its closed state, the valve body 19 is fitted tightly against the valve seat 17, being thus held by the locking engagement between an engagement member 22 fixed to the upper end of the valve stem 23 and the outer distal end of a catch lever 21. This catch lever 21 can be actuated by a piston-cylinder actuator 20 to release the engagement member 22 and therefore the valve stem 23 and the valve body 19. The valve body 19 thereby separates from the valve seat 17 and drops, the valve stem 23 and therefore the valve body 19 being guided by the guide rod 18.

More specifically, the engagement member 22 is in the form of a pin inserted horizontally through the valve stem 23 at a point near the upper end thereof and projecting outward therefrom in opposite directions. When the valve body 19 is to be locked in its closed stage against the valve seat 17, the outwardly projecting ends of this engagement member 22 are respectively engaged by the outer free ends of a pair of lever arms constituting the above mentioned catch lever 21 and disposed on opposite sides of the valve stem 23. These lever arms 21, 21 are integrally fixed at their inner or proximal ends to a horizontal boss 25, which is rotatably supported on a horizontal fixed pivot 24. A lever arm 26 is integrally fixed at its proximal end to the boss 25 and at its free distal end is rotatably pin-connected by a pin 29 to the outer end of the piston rod of the aforementioned piston-cylinder actuator 20. The vertical cylinder of this actuator 20 is pivotally supported at its lower end by a bracket 28 fixed to a frame 27 fixedly supported on the upper part of the aforementioned valve box 16.

Figure 3:
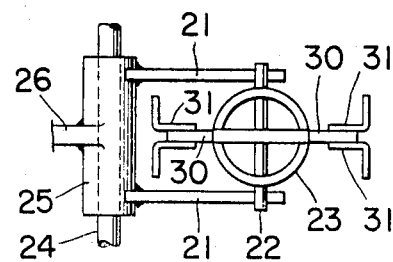
FIG. 3 is a relatively enlarged, partial plan view showing essential parts of a catch mechanism for locking and releasing a valve body in the air admission valve device.

On opposite sides of the upper end part of the valve stem 23, a pair of guided slide plates 30 are fixed to the valve stem 23 and respectively project in opposite directions and are perpendicular to the engagement member 22. As shown in FIG. 3, each guided slide plate 30 is slidably interposed between a pair of opposed vertical guide members 31. The two pairs of these guide members are fixed to the frame 27.

The emergency air admission valve device 14 is provided with means for returning the valve body 19 which has dropped to the bottom of the valve box 16 to its normally closed position against the valve seat 17. In the instant embodiment, the guide rod 18 is of tubular form and receives a return rod 32 inserted therethrough from the bottom. This return rod 32 is driven upward by a driving device (not shown) to return the valve stem 23 and the valve body 19 upward to their positions for closure of the valve 14. p While, in the instant embodiment, the valve body 19 is locked in closed state by the engagement member 22, which is operable by the actuator 20 to release the valve body 19, a valve body locking device in which the valve body 19 is caused to adhere closely against the valve seat 17 by a magnet device, for example, may also be used. The essential requirement is that the valve body locking device be capable of instantaneously releasing the valve body 19 for prompt valve opening action.

The operation of the system of the invention of the above described constitution and arrangement is as follows.

When the emergency valve device 14 is in the state indicated in FIG. 2, the engagement member 22 is locked and prevented from descending by the catch lever 21, whereby the valve body 19 is held in its raised position in closed state against the valve seat 17. In the case when, with the emergency valve device 14 in this state, an emergency state such as a stoppage of the induced-draft fan 7 or some other component such as the control system (the induced-draft fan 7 will not stop abruptly because of its momentum) occurs because of some failure such as power failure, this emergency state is detected by means (not shown) which generates a corresponding signal. In response to this signal, the blowing of oxygen into the converter 1 is stopped, and at the same time this signal is transmitted by way of a signal detection device 33 (FIG. 2) to activate a hydraulic circuit changeover device 34 for driving the piston-cylinder actuator 20. This piston rod of the actuator 20 thereupon is thrust upward as indicated by chain line, and the catch lever 21 separates from the engagement member 22, which is thereby released. Therefore the valve body 19 drops under gravitational force.

In this case, when the blowing in of oxygen stops, the pressure within the converter 1 and the hood 3 becomes negative to some extent. This negative pressure acts as a component of force drawing the valve body 19 downward and has the effect of increasing the initial velocity of descent of the valve body 19 as it starts to drop after being released by the catch lever 21. Thus, the time period from the instant of release of the valve body 19 to the start of its drop is shortened, whereby the valve seat opening 17a is opened instantaneously, and outside air is drawn into the hood 3. The valve body 19 thus drops onto an impact absorbing material 35 on the bottom of the valve box 16.

The outside air thus drawn in flows into the CO gas at high temperature, which undergoes combustion with the $O_2$ in this air, whereby an inert-gas layer as described hereinbefore is formed. At the same, a gas quantity corresponding to the quantity of gas drawn by the induced-draft fan 7 is obtained, and abnormal negative pressure within the exhaust-gas treatment system does not occur. Thereafter, the valve body 19 is raised and returned to its closed position by raising the return rod 32.

In normal operation of the converter and the exhaust-gas treatment system, the valve body 19 is in closed position against the valve seat 17, and recovery of CO gas of high purity is carried out.

As described above, in the exhaust-gas treatment system of a sealed type converter according to this invention, the hood is provided with an air intake duct, and an emergency air admission valve device in which the air intake duct is opened by the dropping action of a valve body. Therefore, even if an emergency stopping of the blowing in of oxygen should occur, the air intake duct is immediately opened to permit the prompt drawing of outside air into the hood, whereby the occurrence of abnormal negative pressure within the exhaust gas treatment system can be prevented.

Therefore, there is no danger such as damage or breakage of the equipment, explosion due to insufficiency of formation of an inert gas layer, and backfiring within the stack, whereby an exhaust-gas treatment system for a sealed type converter of high degree of safety can be provided. Furthermore, CO gas of high purity can be recovered by this system.

What is claimed is:

1. An exhaust-gas treatment system for a sealed-type converter, said system having a hood for guiding converter exhaust gas and being provided with an emergency air admission valve device comprising: a valve box having at the upper part thereof a valve entrance for inflow of outside air; an air intake duct communicatively connecting the valve box and said hood; an annular valve seat formed below said valve entrance at the upper part of the valve box; a valve body which is capable of moving up and down within the valve box between an upper position of valve closure against the valve seat to close the valve entrance and a lower position of full valve opening; guide means for guiding the valve body in the up-and-down movement thereof; and valve body locking means functioning to normally hold the valve body in locked state at said upper position thereof and operating in an emergency to release the valve body thereby to permit the valve body to drop to said lower position thereof and thereby to admit outside air into the hood.

2. An exhaust-gas treatment system for a sealed-type converter as claimed in claim 1 in which a vertical hollow valve stem is fixed integrally and coaxially to the valve body, and the guide means comprises a vertically fixed guide rod, the hollow valve stem being slidably fitted on and around the guide rod.

3. An exhaust-gas treatment system for a sealed-type converter as claimed in claim 2 in which the valve body locking means has an engagement member projecting outward from the outer surface of the valve stem and a catch member which can be actuated to undergo displacement between a locking position for catching against the lower side of the engagement member thereby to prevent the valve stem and the valve body from dropping and a release position at which the catch member has become disengaged from the engagement member thereby permitting the valve stem and the valve body to drop to said lower position of full valve opening.

4. An exhaust-gas treatment system for a sealed-type converter as claimed in claim 3 in which the valve body locking means further has a driving device, and the catch member comprises at least one lever arm capable of being driven in rotational displacement by the driving means.

5. An exhaust-gas treatment system for a sealed-type converter as claimed in claim 2 in which the hollow valve stem has on the outer surface thereof at least one guided slide member, and a guide member is provided along the path of up-and-down movement of the hollow valve stem to guide the guided slide member in up-and-down movement.

6. An exhaust-gas treatment system for a sealed-type converter as claimed in claim 2 in which the guide rod is of tubular shape with a hollow interior through which a return member is inserted for returning the valve body which has dropped to said lower position back to said upper position of valve closure against the valve seat.

* * * * *